(No Model.)
E. KRISPIN.
MANUFACTURE OF BAS RELIEFS FOR CEILINGS, WALLS, &c.
No. 336,055. Patented Feb. 9, 1886.
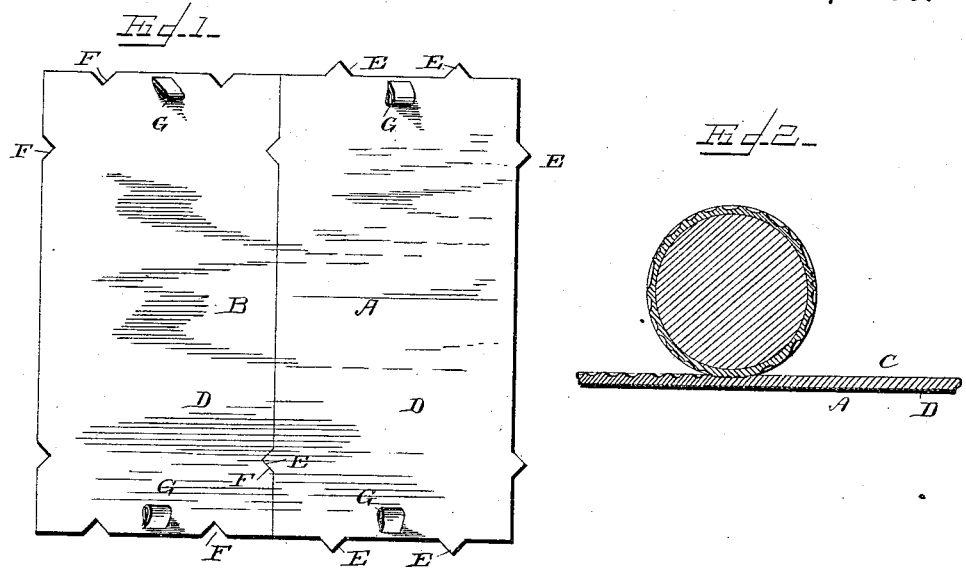
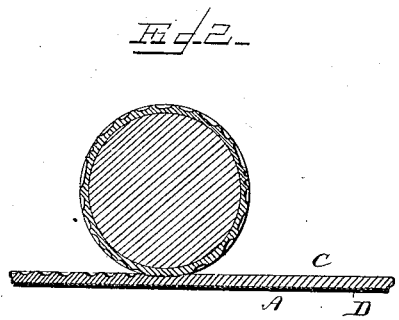
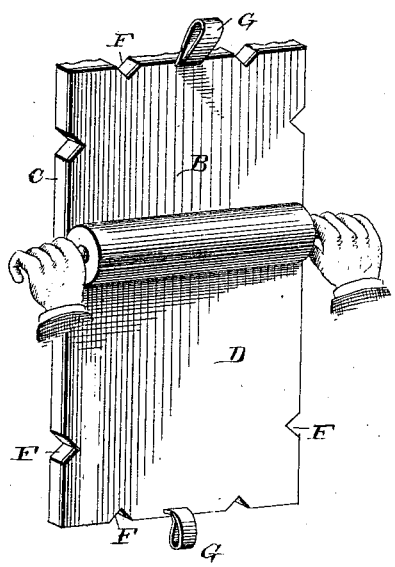
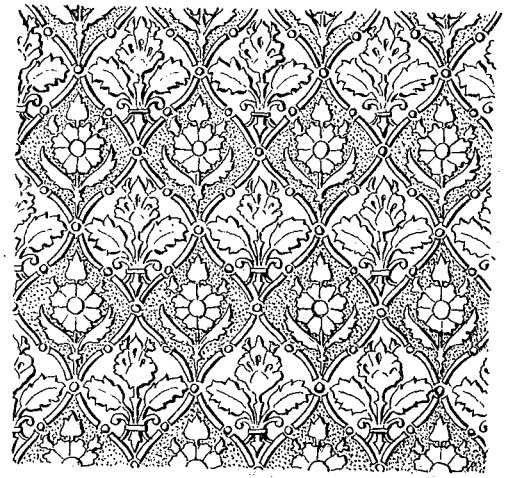
WITNESSES
F. L. Ourand,
Arthur L. Morsell
Edward Krispin,
INVENTOR
By Louis Bagger & Co.
Attorneys

UNITED STATES PATENT OFFICE.

EDWARD KRISPIN, OF CHICAGO, ILLINOIS.

MANUFACTURE OF BAS-RELIEFS FOR CEILINGS, WALLS, &c.

SPECIFICATION forming part of Letters Patent No. 336,055, dated February 9, 1886.

Application filed June 15, 1885. Serial No. 168,739. (No model.)

*To all whom it may concern:*

Be it known that I, EDWARD KRISPIN, a citizen of the United States, and a resident of Chicago, in the county of Cook and State of Illinois, have invented certain new and useful Improvements in Manufacture of Bas-Reliefs for Ceilings, Walls, &c.; and I do hereby declare that the following is a full, clear, and exact description of the invention, which will enable others skilled in the art to which it appertains to make and use the same, reference being had to the accompanying drawings, which form a part of this specification, and in which—

Figure 1 is a view of the molds used in my improved method of producing bas-reliefs on ceilings, walls, &c., showing the molds seen from the back. Fig. 2 is a vertical sectional view showing the manner of producing the said molds or patterns. Fig. 3 is a view showing the manner of applying the patterns, and Fig. 4 is a view of the work produced by the method.

Similar letters of reference indicate corresponding parts in all the figures.

My invention has relation to methods of decorating walls, ceilings, &c., with ornaments appearing in bas-relief; and it consists in the improved method of producing the said ornaments and the patterns for producing the same, as hereinafter more fully described and claimed.

The patterns, which are lettered A and B in the drawings, are formed by spreading a plastic mass, which is produced by mixing glue, shellac, glycerine, turpentine, and sawdust, upon a piece of textile material, and thereupon pressing an intaglio pattern into the mass by means of a roller or other die having the relief-pattern, the plastic mass being shown at C, and the textile backing being shown at D. One of the patterns, A, is provided at suitable distances in its edges with projecting tongues or flaps E, and the other pattern, B, which is of the same size and shape as the first pattern, is formed with notches F in its edges, corresponding in size, shape, and location to the tongues in the other pattern. Both of the patterns are preferably provided with loops or handles G upon their backs, by means of which they may be manipulated. The surface to be ornamented is now coated with a plastic composition, which I prefer to prepare of the following ingredients—viz., pulverized chalk mixed with the color desired to be used for the ornaments, sawdust, powdered linseed, paper-mass, plaster-of-paris, and glue, all mixed in sufficient water to make it plastic. This plastic mass is spread in a level layer upon the surface, whereupon one pattern is placed upon the plastic mass and forced against it by means of a roller, which forces the pattern in such a manner against the plastic mass that the latter will enter and fill out all the cavities in the intaglio pattern, which, prior to being applied, has been provided with a thin coat of oil or similar fatty substance to prevent the mass from sticking to the pattern. The other pattern is now placed at the side of the former pattern and treated in the same manner by the roller, the tongues of one pattern fitting into the notches of the other pattern, which will enable the patterns to be placed so close to each other and to be fitted so accurately against each other that the plastic mass will not be pressed up between the patterns and form raised rims. The tongues of one mold fitting into the notches of the other molds serve to effectually prevent the molds slipping when placed side by side of the wall, which would be liable to occur, especially under the pressure of the operating-roller, were it not for the projecting tongues fitting closely within the notches in the sides and ends of the molds. Where the ornamentation is intended to be rather raised, containing portions projecting in considerable relief from the surface, the plastic mass may be spread upon the pattern, filling the deeper portions of the same, whereupon the surface may be covered with the plastic mass, and the filled pattern placed against it and pressed by means of the roller, when the mass spread upon the pattern and the mass spread upon the surface will unite and the raised ornaments appear perfect. It may also at times be expedient to first impress a rather low pattern into the mass spread upon the surface, and thereupon fill smaller molds with plastic mass, and apply these molds at places where a highly-raised pattern is desired, the said raised portions being placed upon the low surface immediately after the mold has been removed from the same and the plastic mass is fresh and soft.

Instead of applying the plastic mass directly to the surface to be decorated, and thereupon impressing the relief-pattern upon the same, the mass may be spread upon suitable tables or other flat surfaces, a substance having been spread upon the surface which will cause the plastic mass to slip after it has dried, and the pattern, which of course must be one which consists of the same design repeated, may then be impressed into the mass by the flexible patterns or molds and the roller. Any pattern which is repeated, and which consists of regular figures which may be brought to fit with each other may in this manner be produced in plates or slabs, which may be afterward applied to the surface to be decorated in any desirable manner.

It will be seen that a flexible mold composed of the specified ingredients is entirely different in construction, and possesses decided advantages over a mold composed of glue alone. After the mold has been filled with plaster and applied, with its filling, to the wall or ceiling to be decorated, a mold composed of glue alone (which when it hardens is brittle) would not possess sufficient flexibility to permit of its being bent or doubled to remove it from the filling, which has adhered to the wall or to the molding or other irregular form to which it has been applied, without there being danger of marring or pulling out of shape the filling or ornament which has been freshly applied to the wall or molding. Again, where the flexible mold has been applied to a surface freshly coated with a plastic mass on which the relief-pattern is to be formed by the mold or pattern, the superior flexibility of applicant's mold enables it to be removed from the pattern which it has formed with greater ease and with less danger to the relief-pattern formed than is possible with a pattern composed solely of glue; also, where the mold has been filled with plaster and the plaster allowed to harden therein to form an ornament, if the said plaster should adhere to the mold when hardened, applicant's mold, constructed of the specified ingredients, can be bent and doubled upon itself in any manner to free it from the hardened ornament without there being the slightest danger of cracking or breaking the mold, which would be very liable to occur if a mold formed of glue alone (which would be far more brittle than applicant's mold) were employed.

The textile back of applicant's mold also adds to its toughness or wearing qualities, and also prevents the roller from sticking to the back of the mold while it is being applied to the surface being ornamented, while the tabs G add to the convenience with which the molds may be handled.

I am aware that a flexible mold adapted to accommodate itself to the inequalities of the surface being decorated is old, and I do not, therefore, broadly claim a flexible mold; but

What I claim as my invention, and desire to secure by Letters Patent of the United States, is—

1. A flexible mold composed of glue, shellac, glycerine, turpentine, and sawdust mixed to form a plastic mass, and having a suitable pattern in its upper face.

2. A flexible mold for producing bas-relief for ceilings, walls, &c., the same being composed of glue, shellac, glycerine, turpentine, and sawdust mixed to form a plastic mass, and having an intaglio pattern in its upper face.

3. A flexible mold for producing bas-relief for ceilings, walls, &c., the same consisting of glue, shellac, glycerine, turpentine, and sawdust mixed upon a piece of textile fabric which forms a backing for the said plastic mass, and having an intaglio pattern in its upper face.

4. The combination of flexible molds provided at their edges with notches and tongues arranged to engage with each other in the manner and for the purpose shown and set forth.

5. The combination of the herein-described flexible molds, consisting each of a flexible mass of glue, shellac, glycerine, turpentine, and sawdust mixed upon a piece of textile fabric, and having intaglio patterns in their upper face, the said molds being provided at their edges with notches and tongues arranged to engage with each other in the manner and for the purpose herein specified.

In testimony that I claim the foregoing as my own I have hereunto affixed my signature in presence of two witnesses.

EDWARD KRISPIN.

Witnesses:
B. BENJAMIN,
WILLIAM FRIES.